US010280363B2

(12) United States Patent
Suzart et al.

(10) Patent No.: US 10,280,363 B2
(45) Date of Patent: May 7, 2019

(54) METHOD OF USING LOW-STRENGTH PROPPANT IN HIGH CLOSURE STRESS FRACTURES

(71) Applicant: Halliburton Energy Services, Inc., Houston, TX (US)

(72) Inventors: Joao Walter Pereira Suzart, Bahia (BR); Clarence John Bertrand, Jr., Hallsville, TX (US); Anupom Sabhapondit, Eastern Province (SA)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/551,207

(22) PCT Filed: Jul. 7, 2015

(86) PCT No.: PCT/US2015/039420
§ 371 (c)(1),
(2) Date: Aug. 15, 2017

(87) PCT Pub. No.: WO2017/007462
PCT Pub. Date: Jan. 12, 2017

(65) Prior Publication Data
US 2018/0016489 A1    Jan. 18, 2018

(51) Int. Cl.
*E21B 43/267* (2006.01)
*C09K 8/80* (2006.01)
(Continued)

(52) U.S. Cl.
CPC ............ *C09K 8/805* (2013.01); *C09K 8/62* (2013.01); *C09K 8/80* (2013.01); *E21B 43/267* (2013.01); *C09K 2208/08* (2013.01); *E21B 43/26* (2013.01)

(58) Field of Classification Search
CPC . C09K 8/80; C09K 8/805; C09K 8/62; C09K 2208/08
See application file for complete search history.

(56) References Cited

U.S. PATENT DOCUMENTS 5,582,249 A     12/1996  Caveny et al.
5,765,642 A *   6/1998   Surjaatmadja ........ E21B 43/114
                                                166/177.5
(Continued)

FOREIGN PATENT DOCUMENTS

EP        2469020 A1    6/2012
WO    2009078745 A1    6/2009

OTHER PUBLICATIONS

Nguyen, P.D. et al., Evaluation of Low-Quality Sand for Proppant-Free Channel Fracturing Method, IPTC 17937, presented at International Petroleum Technology Conference in Kuala Lumpur, Malaysia, Dec. 10-12, 2014.

*Primary Examiner* — Angela M DiTrani Leff
(74) *Attorney, Agent, or Firm* — McAfee & Taft

(57) ABSTRACT

A method comprising: introducing into a fracture within a subterranean formation a first treatment fluid comprising uncoated first proppant particulates; introducing into the fracture a second treatment fluid comprising non-hardenable coated second proppant particulates to form a proppant pack; and introducing into the fracture a third treatment fluid comprising hardenable coated third proppant particulates intermittently between a spacer fluid to form pillars.

19 Claims, 2 Drawing Sheets

(51) Int. Cl.
  *C09K 8/62* (2006.01)
  *E21B 43/26* (2006.01)

(56) References Cited

U.S. PATENT DOCUMENTS

| | | |
|---|---|---|
| 5,775,425 A | 7/1998 | Weaver et al. |
| 5,787,986 A | 8/1998 | Weaver et al. |
| 5,833,000 A | 11/1998 | Weaver et al. |
| 5,839,510 A * | 11/1998 | Weaver ................ C09K 8/5086 166/276 |
| 5,853,048 A | 12/1998 | Weaver et al. |
| 5,871,049 A | 2/1999 | Weaver et al. |
| 6,668,926 B2 | 12/2003 | Nguyen et al. |
| 6,725,931 B2 | 4/2004 | Nguyen et al. |
| 6,729,404 B2 | 5/2004 | Nguyen et al. |
| 6,962,200 B2 | 11/2005 | Nguyen et al. |
| 7,131,491 B2 | 11/2006 | Blauch et al. |
| 7,255,169 B2 | 8/2007 | van Batenburg et al. |
| 7,281,581 B2 | 10/2007 | Nguyen et al. |
| 7,413,017 B2 | 8/2008 | Nguyen et al. |
| 7,754,659 B2 | 7/2010 | Rediger et al. |
| 8,540,024 B2 | 9/2013 | Kosarev et al. |
| 8,689,872 B2 * | 4/2014 | Welton .................. C09K 8/508 166/285 |
| 2005/0051332 A1 | 3/2005 | Nguyen et al. |
| 2005/0145385 A1 * | 7/2005 | Nguyen .................. C09K 8/68 166/279 |
| 2006/0157243 A1 * | 7/2006 | Nguyen ................ C09K 8/805 166/280.2 |
| 2012/0305247 A1 | 12/2012 | Chen et al. |
| 2014/0060842 A1 | 3/2014 | Neal et al. |
| 2014/0131041 A1 | 5/2014 | Liang et al. |

\* cited by examiner

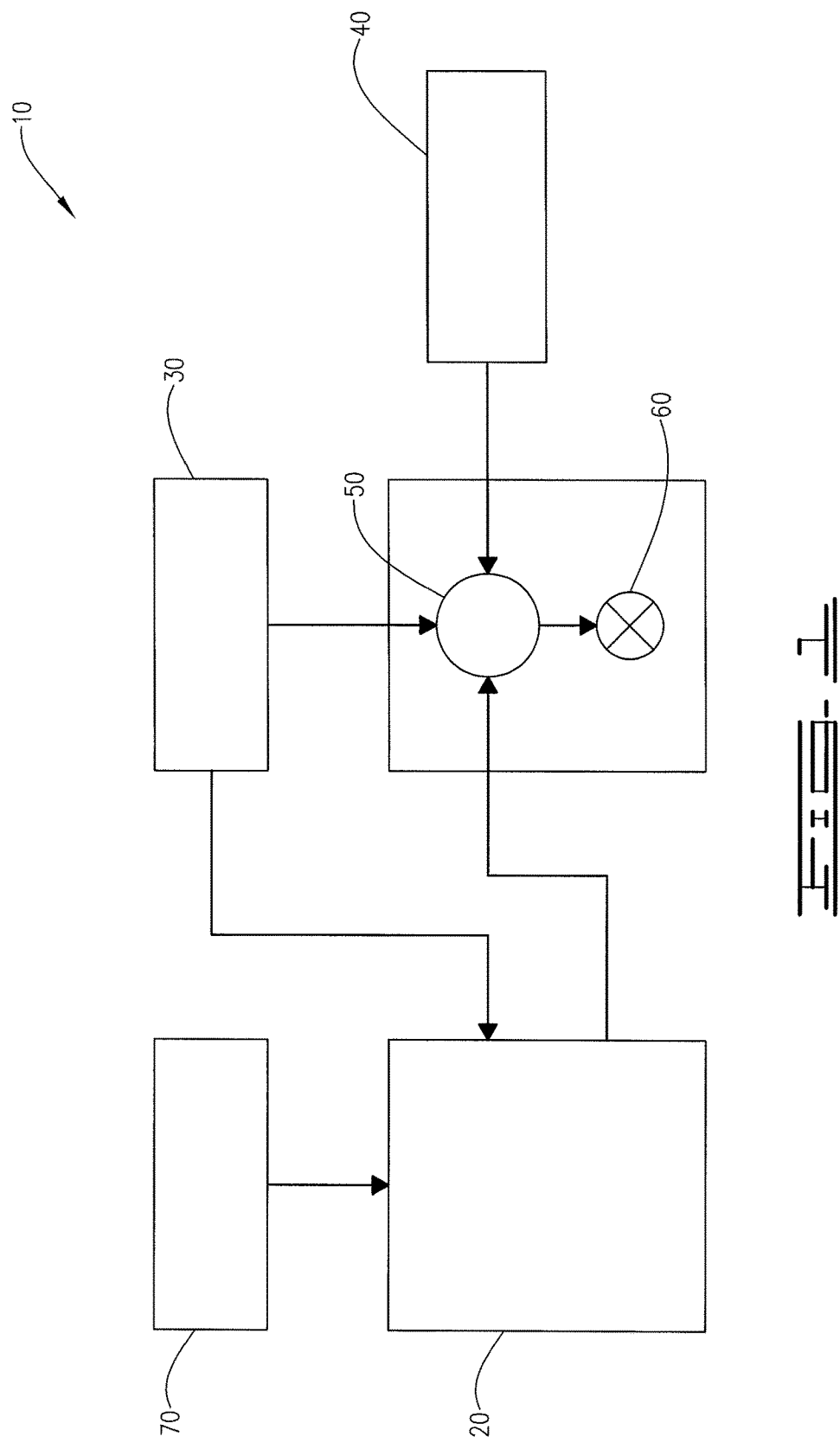

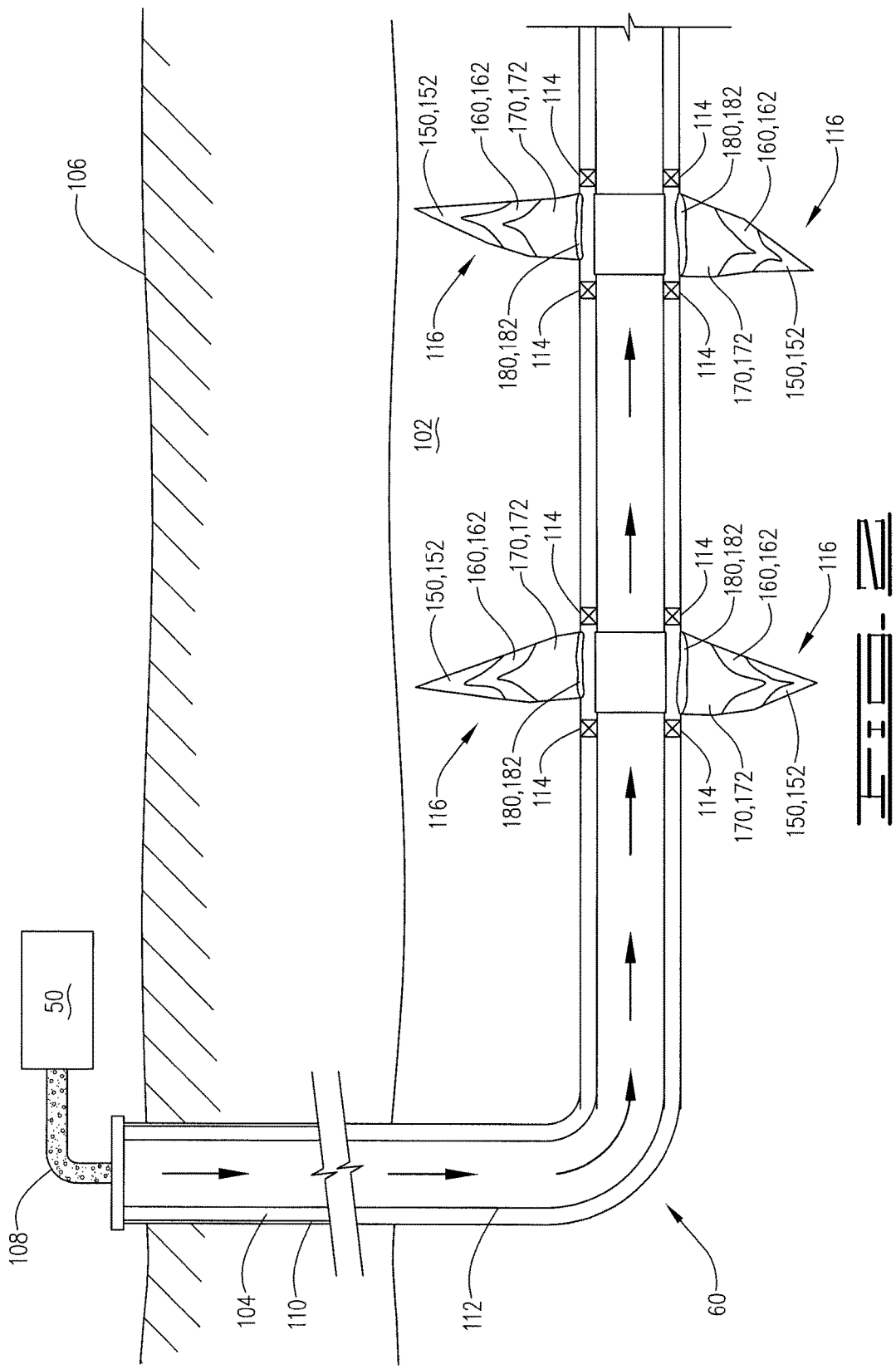

METHOD OF USING LOW-STRENGTH PROPPANT IN HIGH CLOSURE STRESS FRACTURES

FIELD

The present disclosure relates to enhancing the production of hydrocarbons from a subterranean formation and, more particularly, to an improved method of placing proppant into a subterranean formation.

BACKGROUND

To produce oil or gas from a reservoir, a well is drilled into a subterranean formation, which may be the reservoir or may be adjacent to the reservoir. A subterranean well includes a wellhead and at least one wellbore from the wellhead penetrating the earth. Typically, a wellbore must be drilled thousands of feet into the earth. Generally, as the depth of the formation increases, the static pressure and temperature of the formation increases.

Subterranean wells (e.g., hydrocarbon producing wells, water producing wells, or injection wells) are often stimulated by hydraulic fracturing treatments. In traditional hydraulic fracturing treatments, a treatment fluid, which may also function simultaneously, or subsequently as a carrier fluid, is pumped into a portion of a subterranean formation at a rate and pressure sufficient to break down the formation and create one or more fractures therein. Typically, particulate solids are suspended in a portion of the treatment fluid and then deposited into the fractures. These particulate solids, or "proppant particulates," serve to prevent the fractures from fully closing once the hydraulic pressure is removed. By keeping the fractures from fully closing, the proppant particulates aid in forming conductive paths through which fluids produced from the formation may flow.

The degree of success of a fracturing operation depends, at least in part, upon fracture porosity and conductivity once the fracturing operation is complete and production has begun. Traditional fracturing operations place a large volume of proppant particulates into a fracture to form a "proppant pack" in order to ensure that the fracture does not close completely upon removing the hydraulic pressure. The ability of proppant particulates to maintain an open fracture open depends upon the ability of the proppant particulates to withstand fracture closure pressure and, therefore, is typically proportional to the volume of proppant particulates placed in the fracture. The porosity of a proppant pack within a fracture is related to the interconnected interstitial spaces between abutting proppant particulates. Thus, the fracture porosity is closely related to the strength of the placed proppant particulates and often tight proppant packs are unable to produce highly conductive channels within a fracture, while reducing the volume of the proppant particulates is unable to withstand fracture closures.

One way proposed to combat the problems inherent in tight proppant packs involves the use of proppant pillars. As used herein, the term "proppant pillar" refers to a coherent body of consolidated proppant particulates that generally remain a coherent body. Proppant pillars are comprised of a plurality of proppant particulates formed into a tight cluster and are capable of withstanding fracture closure pressures. The use of proppant pillars, therefore, may reduce the likelihood of partial or complete fracture closure. The proppant pillars placed into a fracture do not abut together perfectly and therefore may achieve infinite conductivity channels (e.g., unobstructed pathways) for produced fluid flow.

While proppant pillars can overcome certain issues associated with tight proppant packs, in practice several issues may prevent their optimal performance. For example, proppant pillars of low-strength proppant, such as silica sand, are not conventionally used in high closure stress fractures, or a fracture having a closure pressure exceeding about 8,000 psi, due to their inability to withstand such pressure. Thus, alternative proppants of higher strength are usually employed in high closure stress fractures. Unfortunately, high strength proppants typically cost more than low strength proppants; thus, increasing costs associated with the hydraulic fracturing of high closure stress fractures.

In addition, although proppant pillars provide greater conductivity channels for fluid flow, the problems associated with formation and migration still persist. Fines are formed in a number of ways. For example, fines are generated when proppant particulates are crushed due to their inability to withstand fracture closure stress. Fines are also formed due to mechanical and/or natural degradation of subterranean formations, especially in soft rock reservoirs like, sandstone, shale or coal. Regardless of how the fines are formed, fine migration decreases well performance even in fractures having proppant pillars.

Accordingly, there is a need for improved methods of propping a fracture using low-strength proppant particulates in order to reduce costs while maintaining the minimization of fine migration especially in soft rock reservoirs.

BRIEF DESCRIPTION OF THE DRAWINGS

Implementations of the present technology will now be described, by way of example only, with reference to the attached figures, wherein:

FIG. 1 is a schematic diagram illustrating an example of a fracturing system that may be used in accordance with certain embodiments of the present disclosure.

FIG. 2 is a schematic illustration illustrating an example of a subterranean formation in which a fracturing operation may be performed in accordance with certain embodiments of the present disclosure.

DETAILED DESCRIPTION

The present disclosure may be understood more readily by reference to the following detailed description as well as to the examples included therein. For simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Of the many advantages of the present disclosure, the methods disclosed provide for the use of a low-strength proppant particulate to maintain propped fractures found in high closure stress fractures. High closure stress fractures are fractures that have a closure pressure exceeding about 8,000 psi, about 9,000 psi, about 10,000 psi, about 11,000 psi or about 12000 psi. Generally, a low-strength proppant is not the predominate type of proppant used to prop open high closure stress fractures due to the proppant's inability to withstand such pressure. Fortunately, the methods disclosed herein increase the stress range of low-strength proppants in hydraulic fracturing. In addition, using low-strength proppants in high closure stress fractures instead of high-strength proppants provides economic advantages as well. For example, utilizing the methods disclosed herein increases efficiency and decreases costs so as to provide a 33% economical improvement over conventional methods. Furthermore, the disclosed method is suited for minimizing fine generation throughout the lifecycle of the well, especially in soft rock formations, such as sandstone, shale or coal.

The present disclosure provides methods of pumping low-strength proppant particulates into high closure stress fractures. More specifically, the method includes forming proppant packs and proppant pillars of low-strength proppant particulates in high closure stress fractures. The methods of the present disclosure may be utilized in vertical and horizontal drilled wells and in main wellbores or lateral wellbores.

Fracture flow capacity is largely determined by the type of proppant that is placed in the fracture. Although, sand has historically been used as a propping agent, sand is typically not used at pressures greater than about 8,000 psi due to the severe crushing of the sand at such pressures. To withstand such pressures, synthetic proppant, such as bauxite and ceramic, are conventionally utilized. However, the methods disclosed herein minimize cost and provide novel alternatives to improve conductivity and strength of the sand through the formation of pillars, and the use and combination of tackifying agents and resin compositions so that sand can be the predominate propping agent in high closure stress fractures.

In one embodiment, the present disclosure provides a method of treating a subterranean formation comprising pumping in sequential order a first treatment fluid, a second treatment fluid, a third treatment fluid and a fourth treatment fluid. The treatment fluids of the present disclosure comprise an aqueous base fluid. Any base fluid suitable for use in a stimulation or well operation may be used in the treatment fluids of the present disclosure. Suitable aqueous base fluids include fresh water, salt water, brine, formation brine, seawater, or any other aqueous fluid that, preferably, does not adversely interact with the other components used in accordance with this disclosure or with the subterranean formation.

In the discussion below, the first treatment fluid, second treatment fluid, third treatment fluid and fourth treatment fluid comprise an aqueous base fluid and a proppant and can consist essentially of an aqueous base fluid and a proppant. "Aqueous base fluid" can include viscosifiers and other gelled, liquid or soluble additives added to the base fluid (fresh water, salt water, brine, etc.) but does not include proppants or suspended solids.

The first treatment fluid comprises an uncoated first proppant particulate. The first proppant particulate can be a low-strength proppant particulate. Generally, the uncoated first proppant particulate is substantially free of a non-hardenable coating and/or a hardenable coating. More specifically, the uncoated first proppant particulate is free from a tackifying agent and/or resin composition.

Low-strength proppant particulates are proppants having a crush strength able to withstand pressures below about 8,000 psi. Examples of low-strength proppant particulates include naturally occurring silica sand and the like. In some embodiments, the size of the first proppant particulate can be no larger than 80 mesh and no smaller than 120 mesh on the U.S. Standard Sieve Series. In other embodiments, the first proppant particulate can be about 100 mesh. The concentration of first proppant particulate can be typically about 0.25 to about 1 pound of first proppant particulate to about 1 gallon of first aqueous base fluid.

The small mesh size of the first proppant increases fluid flow through the fracture by propping open areas of the fracture that are often too small for traditional proppant particulates. For example, in some formations like shales, fractures can further branch into small fractures extending from a primary fracture.

The first treatment fluid may be introduced into the subterranean formation as a fracturing fluid or as a treatment fluid for proppant packing. As a fracturing fluid, the first treatment fluid is pumped into the subterranean formation at a rate and pressure sufficient to create at least one fracture in the formation into which the first proppant particulate is introduced to prop the created fracture open to facilitate hydrocarbon production.

As a treatment fluid for proppant packing, the first treatment fluid would be introduced into the subterranean formation after fractures are formed. Treatment fluids for proppant packing are pumped at lower rates and pressures so that the treatment fluid can be introduced into a formation to create a controlled particle size proppant pack.

Once the last of the first treatment fluid is pumped into the subterranean formation, a second treatment fluid is introduced into the subterranean formation. The second treatment fluid comprises the aqueous base fluid and a non-hardenable coated second proppant particulate. The second proppant particulate also can be a low-strength proppant particulate. In some embodiments, the size of the second proppant particulate is no smaller than 70 mesh, generally, no smaller than 60 mesh and typically, no smaller than 50 mesh on the U.S. Standard Sieve Series. Additionally, the size of the second proppant particulate is no larger than 20 mesh, generally, no larger than 30 mesh and typically, no larger than 40 mesh on the U.S. Standard Sieve Series. For example, in some embodiments, the second proppant particulates can be a blend of sizes between 70 mesh and 40 mesh, 50 mesh and 30 mesh or 40 mesh and 20 mesh. The concentration of second proppant particulate can be about 1 to about 2 pounds of second proppant particulate to about 1 gallon of aqueous base fluid.

The non-hardenable coating on the second proppant particulate comprises a tackifying agent. Some or all of the second proppant particulate can be coated with the tackifying agent. The tackifying agent acts to consolidate and helps hold together the second proppant particulates to form a proppant pack when introduced into the fracture. The tackifying agent also tends to cause small particulates, such as fines from soft-rock reservoirs or crushed proppant particulates, to stick to the outside of the second proppant. This helps prevent the fines from flowing with a treatment fluid, oil, natural gas, water or mixture thereof, which could potentially clog openings in the proppant pack and decrease hydrocarbon production.

As used herein, the term "tacky," in all of its forms, refers to a substance having a nature such that it is, or may be activated to become, somewhat sticky to the touch. In coated proppants, the tacky exterior at subterranean formation conditions forms proppant aggregates from individual proppant particles, preventing their dispersion when introduced to the subterranean formation. Additionally, the tacky material will inhibit movement of fines to the near-wellbore region of the formation.

One test to determine tackiness is the test provided in the article New Optimized Laboratory Testing Methods to Study the Effectiveness of Surface Modification Agents by Christopher Parton, et al., presented at the 2014 American Association of Drilling Engineers Fluids Technical Conference and Exhibition held at the Hilton Houston North Hotel at Houston, Tex. on Apr. 15-16, 2014 (herein after "NOLTM Tackiness Test"). The method provided therein tests the tackiness of a substance by testing the torque resistance on a crossbar at the surface of the proppant. The apparatus used to test the proppant was a Brookfield RVDI-II+ viscometer. During this test, the Spindle C from the Helipath spindle set was used. The spindle has a crossbar at the lower end. The upper end of the spindle is affixed to the bottom of a torsiometer so that the cohesion or tackiness between proppant particles can be measured in terms of a torque-resistance measurement.

To measure the cohesion between the proppant particles, the spindle is lowered into water covered proppant particles until the crossbar is just beneath the top layer of the proppant. The torsiometer is turned on to begin the measurement of the torque-resistance which provides a direct reading of the cohesion value.

The crossbar is immersed below the top layer of the proppant and rotates in a water covered sample settled in the container. As the spindle rotates, the crossbar sweeps across the proppants that resist the rotation. The torque resistance is registered by a spring that winds up while rotating inside the instrument. A digital torsiometer has an electronic sensing system that reads the spring deflection. The on-board firmware then converts the torque reading into a cohesion reading, thus accounting for the instrument's spring torque range, spindle, and speed (in rev/min). The measured apparatus cohesion is a function of the shear rate. The shear rate, in turn, depends on (1) the geometry, including the cross-bar size and (2) the test (rotational) speed. The yield stress is the stress at which the proppant begin to move or detach as a liquid. The degree of slip is basically a measurement of significant tackiness or a complete lack of tack or grip between the proppant and the crossbar. The torque resistance of the proppant, measured in $(N*s)/m^2$, is then plotted against coating, or variably tacky material, concentration recorded in terms of percent v/w. According to above method, a non-tacky material has a slope less than or equal to 1.5. According to the method provided therein, a tacky material has a slope greater than 1.5.

Compounds suitable for use as a tackifying agent comprise substantially any compound which when in liquid form or in a solvent solution will form a non-hardening coating, by themselves, upon the proppant particulate. Tackifying agents include, but are not limited to: polyamides, polyesters, polyethers and polycarbamates, polycarbonates, and any combination thereof in any proportion. Other tackifying agents can be produced by the reaction of a polyacid with a multivalent ion such as calcium, aluminum, iron or the like. Additional examples of tackifying agents suitable for coating particulates are described in U.S. Pat. Nos. 5,853,048; 5,833,000; 5,582,249; 5,775,425; 5,787,986; and 7,131,491. An example of a suitable commercially available tackifying agent is the SANDWEDGE™ product sold by Halliburton Energy Services, Inc. of Duncan, Okla.

Typically, the tackifying agent is admixed with the second proppant particulate in an amount of from about 0.05 to about 3.0 percent by weight of the second proppant particulates. It is to be understood that larger quantities may be used, however, the larger quantities generally do not significantly increase performance and could undesirably reduce the permeability of the particulate pack. Preferably, the tackifying agent is admixed with the second proppant particulate in an amount of from about 0.1 to about 2.0 percent by weight of the second proppant particulate.

The liquid or solution of tackifying agent generally can be incorporated with the second proppant particulate as a simultaneous mixture by introduction of the tackifying agent into the second treatment fluid along with the second proppant particulate. After introduction into the subterranean formation of the first treatment fluid, the second treatment fluid can then pumped into the subterranean formation as a treatment fluid for proppant packing in order to create a controlled particle size proppant pack of coated second proppant particulates.

Once the last of the second treatment fluid is pumped into the subterranean formation, introduction of a third treatment fluid into the subterranean formation begins. The third treatment fluid comprises the aqueous base fluid and a hardenable coated third proppant particulate. The third proppant particulate can also be a low-strength proppant particulate. In some embodiments, the size of the third proppant particulate is no smaller than 70 mesh, generally, no smaller than 60 mesh and typically, no smaller than 50 mesh on the U.S. Standard Sieve Series. Additionally, the size of the third proppant particulate is no larger than 20 mesh, generally, no larger than 30 mesh and typically, no larger than 40 mesh on the U.S. Standard Sieve Series. For example, in some embodiments, the third proppant particulates can be a blend of sizes between 70 mesh and 40 mesh, 50 mesh and 30 mesh or 40 mesh and 20 mesh. The aforementioned mesh sizes of the third proppant provide necessary crush strength to reduce fine generation. In some embodiments, the concentration of third proppant particulate can be about 1 to about 2 pounds of third proppant particulate to about 1 gallon of aqueous base fluid.

The hardenable coating on the third proppant particulate comprises a resin composition. Some or all of the third proppant particulates can be coated with a resin composition. The hardenable resin composition increases the strength of the third proppant particulates and prevents third proppant particle flow back. In addition, the resin composition helps consolidate the third proppant particulates into one or more high-strength proppant pillars. Generally, a hardenable resin deposits on the proppant as a non-tacky coating. Under the NOLTM Tackiness Test, a non-tacky material has a slope less than or equal to 1.5.

The hardenable resin composition can include a hardenable resin and a hardening agent. The hardenable resin includes, but is not limited to, bisphenol A-epichlorohydrin resin, polyepoxide resin, novolak resin, polyester resin, phenol-aldehyde resin, urea-aldehyde resin, furan resin, urethane resin and mixtures thereof. The hardening agents include, but are not limited to, 4,4'-diaminodiphenyl sulfone, amines, amides, hexachloroacetone, 1,1,3-trichlorotrifluoroacetone, benzotrichloride, benzylchloride and benzalchloride. The resin compositions may also comprise a silane coupling agent. Examples of silane coupling agents that can be used in the resin compositions of the present disclosure include, but are not limited to, N-2-(aminoethyl)-3-aminopropyltrimethoxysilane, 3-glycidoxypropyltrimethoxysilane, n-beta-(aminoethyl)-gamma-aminopropyl trimethoxysilane, and combinations thereof. The silane coupling agent chosen is included in the liquid hardening agent component in an amount capable of sufficiently bonding the resin to a particulate. In some embodiments of the present disclosure, the silane coupling agent used is included in the resin composition in the range of from about 0.01% to about 5% by weight of the resin in the resin composition.

Examples of resin compositions suitable for coating third proppant particulates are described in U.S. Pat. Nos. 6,668,926; 6,729,404, 6,725,931; and 6,962,200. An example of a suitable commercially available resin is the EXPEDITE™ product sold by Halliburton Energy Services, Inc. of Duncan, Okla., specifically including EXPEDITE™ 275 or EXPEDITE™ 350.

The hardenable resin and the hardening agent, are stored separately until they are mixed in a desired weight ratio. The ration can be about 1 part hardenable resin to about 1 part hardening agent just prior to being coated onto the third proppant particulate. However, the ratio may be varied and one skilled in the art will recognize the ratio suited for a particular application. Essentially, as the volume ration of the hardening agent increases, the strength of the coated third proppant particulate increases. The hardenable resin and the hardening agent can be mixed by batch mixing to obtain a homogeneous mixture before being coated on third proppant particles. The amount of mixed hardenable resin composition-coated on the proppant ranges from about 0.1% to about 5% by weight of the third proppant particulate, with about 3% being preferred.

After introducing the last of the second treatment fluid, the third treatment fluid containing the hardenable coated third proppant particulates can be pumped into the subterranean formation to form proppant pillars. The proppant pillars of third proppant particulates are preferably formed in situ to allow the proppant pillars to conform to the shape and size of the fracture. In some embodiments, the third treatment fluid is introduced into the subterranean formation intermittently between a spacer fluid (i.e. non-proppant containing aqueous fluid). This may allow the proppant pillars of third proppant particulates to be placed in a more spaced fashion than without the use of the spacer fluid. One of ordinary skill in the art will recognize whether a spacer fluid should be used in a particular application of the methods disclosed herein.

Generally, the dry third proppant particulates are coated with the resin composition (preferably on-the-fly) as the third treatment fluid is pumped into the subterranean formation. The term "on-the-fly" is used herein to mean that a flowing stream is continuously introduced into another flowing stream so that the streams are combined and mixed while continuing to flow as a single stream as part of the on-going treatment. As a result, the hardenable resin coating on the third proppant particulate is fresh and when it hardens and consolidates, the proppant pillars of coated third proppant particulate can withstand high closure stress fractures and prevent third proppant particulate flow-back.

In another embodiment, once the last of the third treatment fluid is pumped into the subterranean formation, a fourth treatment fluid can be introduced into the subterranean formation. The fourth treatment fluid comprises the aqueous base fluid and a fourth proppant particulate coated with a hardenable resin composition for consolidating and increasing the strength of the proppant particulate.

The fourth proppant particulate can be synthetic proppant particulate. The synthetic proppant particulate can include either an intermediate strength proppant or a high-strength proppant or a combination. Intermediate strength proppant particulates are proppants having a crush strength able to withstand pressures up to about 13,000 psi. Intermediate strength proppant includes proppants containing ceramic and the like. High-strength proppant particulates are proppants having a crush strength able to withstand pressures greater than about 13,000 psi. High-strength proppant particulates include proppants containing bauxite and the like. High-strength proppant is conventionally a very expensive material, justified in cost only when placed in ultra-deep subterranean formations, such as those greater than about 18,000 ft. having pressures exceeding about 13,000 psi.

In some embodiments, the size of the fourth proppant particulate is no smaller than 70 mesh, generally, no smaller than 60 mesh and typically, no smaller than 50 mesh on the U.S. Standard Sieve Series. Additionally, the size of the fourth proppant particulate is no larger than 20 mesh, generally, no larger than 30 mesh and typically, no larger than 40 mesh on the U.S. Standard Sieve Series. For example, in some embodiments, the fourth proppant particulates can be a blend of sizes between 70 mesh and 40 mesh, 50 mesh and 30 mesh or 40 mesh and 20 mesh. The aforementioned mesh sizes of the fourth proppant provide necessary crush strength to reduce fine generation. In some embodiments, the concentration of fourth proppant particulate can be typically about 1 to about 2 pounds of fourth proppant particulate to about 1 gallon of aqueous base fluid.

The hardenable coating on the fourth proppant particulate comprises a resin composition as previously described herein. Some or all of the fourth proppant particulates can be coated with the resin composition. The hardenable resin composition increases the strength of the fourth proppant particulates and prevents fourth proppant particle flow back. In addition, the resin composition helps consolidate the fourth proppant particulates into one or more high-strength proppant pillars.

After introduction of the third treatment fluid is complete, the fourth treatment fluid containing the hardenable coated fourth proppant particulates can be pumped into the subterranean formation to form proppant pillars. The proppant pillars of fourth proppant particulates are preferably formed in situ to allow the proppant pillars to conform to the shape and size of the fracture. In some embodiments, the fourth treatment fluid is introduced into the subterranean formation intermittently between a spacer fluid (i.e. non-proppant treatment fluid). This may allow the proppant pillars of fourth proppant particulates to be placed in a more spaced fashion than without the use of the spacer fluid. One of ordinary skill in the art will recognize whether a spacer fluid should be used in a particular application of the methods disclosed herein.

The dry fourth proppant particulates can be coated with the resin composition (preferably on-the-fly) as the fourth treatment fluid is pumped into the subterranean formation. As a result, the hardenable resin coating on the fourth proppant particulate is fresh and when it hardens and consolidates, the proppant pillars of coated fourth proppant particulates can further withstand high closure stress fractures and prevent fourth proppant particulate flow-back.

The respective amount of the first treatment fluid, the second treatment fluid, the third treatment fluid and the fourth treatment fluid placed in a high closure stress fracture is dependent on a variety of factors, including but not limited to, permeability, pressure, hydrocarbon parameters, and temperature. Nevertheless, by way of example, of the total amount of proppant, including low-strength and synthetic, placed in the subterranean fracture, the following embodiments describe the portion allocated to each. In one embodiment, the low-strength proppant accounts for more than about 60% of the total proppant placed in the subterranean formation and the synthetic proppant accounts for less than about 40% of the total proppant placed in the subterranean formation. In another embodiment, the low-strength proppant accounts for more than about 70% of the total proppant placed in the subterranean formation and the synthetic proppant accounts for less than about 30% of the total proppant placed in the subterranean formation. In another embodiment, the low-strength proppant accounts for more than about 80% of the total proppant placed in the subterranean formation and the synthetic proppant accounts for less than about 20% of the total proppant placed in the subterranean formation. In another embodiment, the low-strength proppant accounts for more than about 90% of the total proppant placed in the subterranean formation and the synthetic proppant accounts for less than about 10% of the total proppant placed in the subterranean formation. In another embodiment, the low-strength proppant accounts for more than about 95% of the total proppant placed in the subterranean formation and the synthetic proppant accounts for less than about 5% of the total proppant placed in the subterranean formation.

In some embodiments, the aqueous base fluids of the present disclosure may comprise an aqueous fluid, a gelling agent, and/or crosslinking agent. The gelling agents suitable for use in the present disclosure may comprise any substance (e.g., a polymeric material) capable of increasing the viscosity of the treatment fluid. In certain embodiments, the gelling agent may comprise one or more polymers that have at least two molecules that are capable of forming a crosslink in a crosslinking reaction in the presence of a crosslinking agent, and/or polymers that have at least two molecules that are so crosslinked (i.e., a crosslinked gelling agent). The gelling agents may be naturally-occurring gelling agents, synthetic gelling agents, or a combination thereof. The gelling agents also may be cationic gelling agents, anionic gelling agents, or a combination thereof. Suitable gelling agents include, but are not limited to, polysaccharides, biopolymers, and/or derivatives thereof that contain one or more of these monosaccharide units: galactose; mannose; glucoside; glucose; xylose; arabinose; fructose; glucuronic acid; or pyranosyl sulfate.

The gelling agent may be present in an amount sufficient to provide the desired viscosity. In some embodiments, the gelling agents (i.e., the polymeric material) may be present in an amount in the range of from about 0.1% to about 10% by weight of the treatment fluids. In certain embodiments, the gelling agents may be present in an amount in the range of from about 0.15% to about 2.5% by weight of the treatment fluid. In those embodiments of the present invention where it is desirable to crosslink the gelling agent, the crosslinking agents may comprise a borate ion, a metal ion, or similar component that is capable of crosslinking at least two molecules of the gelling agent. Examples of suitable crosslinking agents include, but are not limited to, borate ions; magnesium ions; zirconium IV ions; titanium IV ions; aluminum ions; antimony ions; chromium ions; iron ions; copper ions; magnesium ions; and zinc ions. These ions may be provided by adding any compound that is capable of producing one or more of these ions. Examples of such compounds include, but are not limited to, ferric chloride; boric acid; disodium octaborate tetrahydrate; sodium diborate; pentaborates; ulexite; colemanite; magnesium oxide; zirconium lactate; zirconium triethanol amine; zirconium lactate triethanolamine; zirconium carbonate; zirconium acetylacetonate; zirconium malate; zirconium citrate; zirconium diisopropylamine lactate; zirconium glycolate; zirconium triethanol amine glycolate; zirconium lactate glycolate; titanium lactate; titanium malate; titanium citrate; titanium ammonium lactate; titanium triethanolamine; titanium acetylacetonate; aluminum lactate; aluminum citrate; antimony compounds; chromium compounds; iron compounds; copper compounds; zinc compounds; and combinations thereof. In certain embodiments of the present invention, the crosslinking agent may be formulated to remain inactive until it is "activated" by, among other things, certain conditions in the fluid (e.g., pH, temperature, etc.) and/or interaction with some other substance. In some embodiments, the activation of the crosslinking agent may be delayed by encapsulation with a coating (e.g., a porous coating through which the crosslinking agent may diffuse slowly, or a degradable coating that degrades downhole) that delays the release of the crosslinking agent until a desired time or place. The choice of a particular crosslinking agent will be governed by several considerations that will be recognized by one skilled in the art, including but not limited to the type of gelling agent included, the molecular weight of the gelling agent(s), the conditions in the subterranean formation being treated, the safety handling requirements, the pH of the treatment fluid, temperature, and/or the desired delay for the crosslinking agent to crosslink the gelling agent molecules.

Optionally, the first treatment fluid, the second treatment fluid, the third treatment fluid and/or the fourth treatment fluid may further comprise fiber particles, or fibers. Fibers can comprise degradable and non-degradable material. Fibers of non-degradable material include, but are not limited to, ceramic, carbon, glass, nylon and metal. Fibers of degradable material include, but are not limited to, oil-degradable materials, degradable polymers, dehydrated compounds, and mixtures thereof. Degradable materials are capable of undergoing an irreversible degradation downhole. The term "irreversible" as used herein means that the degradable material, once degraded downhole, should not recrystallize or reconsolidate, e.g., the degradable material should degrade in situ but should not recrystallize or reconsolidate in situ.

One purpose of including degradable fibers in the first treatment fluid, the second treatment fluid, the third treatment fluid and/or the fourth treatment fluid is to ensure the permeability of the propped fracture. As the degradable fibers degrade with time, the porosity of the propped fracture increases. The degradable particles are preferably substantially uniformly distributed throughout the first treatment fluid, the second treatment fluid, the third treatment fluid and/or the fourth treatment fluid and, in turn, the high closure stress fractures. Over time, the degradable fibers will degrade in situ, causing the degradable fibers to substantially be removed from the proppant aggregates and to leave behind voids in the proppant packs and proppant pillars. These voids enhance the porosity of the proppant packs and proppant pillars, which may result, inter alia, in enhanced conductivity.

In some embodiments the fibers include oil-degradable materials. Suitable oil-degradable materials include oil-degradable polymers. Oil-degradable polymers that may be used in accordance with the present invention may be either natural or synthetic polymers. Some particular examples include, but are not limited to, polyacrylics, polyamides, and polyolefins (such as polyethylene, polypropylene, polyisobutylene, and polystyrene). Other suitable oil-degradable polymers include those that have a melting point which is such that the polymer will dissolve at the temperature of the subterranean formation in which it is placed such as a wax material.

Suitable examples of degradable polymers that may be used in accordance with the present invention include, but are not limited to, homopolymers, random, block, graft, and star- and hyper-branched polymers. Specific examples of suitable polymers include polysaccharides such as dextran or cellulose; chitin; chitosan; proteins; aliphatic polyesters; poly(lactide); poly(glycolide); poly(ε-caprolactone); poly(hydroxybutyrate); poly(anhydrides); aliphatic polycarbonates; poly(ortho esters); poly(amino acids); poly(ethylene oxide); polyphosphazenes, and combinations thereof. Polyanhydrides are another type of particularly suitable degradable polymer useful in the present invention. Examples of suitable polyanhydrides include poly(adipic anhydride), poly(suberic anhydride), poly(sebacic anhydride), and poly(dodecanedioic anhydride). Other suitable examples include but are not limited to poly(maleic anhydride) and poly(benzoic anhydride). One skilled in the art will recognize that plasticizers may be included in forming suitable polymeric degradable materials of the present invention. The plasticizers may be present in an amount sufficient to provide the desired characteristics, for example, more effective compatibilization of the melt blend components, improved processing characteristics during the blending and processing steps, and control and regulation of the sensitivity and degradation of the polymer by moisture.

Suitable dehydrated compounds are those materials that will degrade over time when rehydrated. For example, a particulate solid dehydrated salt or a particulate solid anhydrous borate material that degrades over time may be suitable. Specific examples of particulate solid anhydrous borate materials that may be used include but are not limited to anhydrous sodium tetraborate (also known as anhydrous borax), and anhydrous boric acid. These anhydrous borate materials are only slightly soluble in water. However, with time and heat in a subterranean environment, the anhydrous borate materials react with the surrounding aqueous fluid and are hydrated. The resulting hydrated borate materials are substantially soluble in water as compared to anhydrous borate materials and as a result degrade in the aqueous fluid.

Blends of certain degradable materials and other compounds may also be suitable. One example of a suitable blend of materials is a mixture of poly(lactic acid) and sodium borate where the mixing of an acid and base could result in a neutral solution where this is desirable. Another example would include a blend of poly(lactic acid) and boric oxide. Another example of a suitable blend is a composite of poly(lactic acid) and calcium carbonate, both will go into solution once the poly(lactic acid) begins to degrade. In choosing the appropriate degradable material or materials, one should consider the degradation products that will result. The degradation products should not adversely affect subterranean operations or components. The choice of degradable material also can depend, at least in part, on the conditions of the well, e.g., well bore temperature. For instance, lactides have been found to be suitable for lower temperature wells, including those within the range of 60° F. to 150° F., and polylactide have been found to be suitable for well bore temperatures above this range. Poly(lactic acid) and dehydrated salts may be suitable for higher temperature wells. Also, in some embodiments, a preferable result is achieved if the degradable material degrades slowly over time as opposed to instantaneously. In some embodiments, it may be desirable when the degradable material does not substantially degrade until after the degradable material has been substantially placed in a desired location within a subterranean formation.

The specific features of the fiber may be chosen or modified to provide the high closure stress fractures with optimum conductivity. Preferably, the fiber is selected to have a size and shape similar to the size and shape of the first proppant particulates, the second proppant particulates, the third proppant particulates and/or the fourth proppant particulates to help maintain substantial uniformity within the mixture. It is preferable that the first proppant particulates, the second proppant particulates, the third proppant particulates and/or the fourth proppant particulates and the fiber do not segregate within the treatment fluids.

Whichever fiber is utilized, the fiber may have any shape, including, but not limited, platelets, shavings, flakes, ribbons, rods, strips, spheroids, toroids, pellets, tablets, or any other physical shape. The physical shape of the fiber should be chosen so as to enhance the desired shape and relative composition of the resultant voids within the proppant packs and/or proppant pillars. For example, a rod-like particle shape may be suitable in applications wherein channel-like voids are desired. One of ordinary skill in the art, with the benefit of this disclosure, will recognize the specific fibers and the preferred size and shape for a given application.

In some embodiments, from 10% to about 90% of the combined weight of the fiber and either the first proppant particulates, the second proppant particulates, the third proppant particulates or the fourth proppant particulates included in the respective treatment fluid are fibers. In other embodiments, from about 20% to about 70% of the combined weight of the fiber and either the first proppant particulates, the second proppant particulates, the third proppant particulates or the fourth proppant particulates included in the respective treatment fluid are fibers. In still other embodiments, from about 25% to about 50% of the combined weight of the fiber and either the first proppant particulates, the second proppant particulates, the third proppant particulates or the fourth proppant particulates included in the respective treatment fluid are fibers. The relative amounts of the fibers should not be such that, when degraded, an undesirable percentage of voids are created in the proppant packs and/or proppant pillars making such proppant packs and/or proppant pillars potentially ineffective in maintaining the integrity of the high closure stress fracture. One of ordinary skill in the art, with the benefit of this disclosure, will recognize an optimum concentration of fibers that provides desirable values in terms of enhanced conductivity or permeability without undermining the stability of the proppant packs and/or proppant pillars.

As previously, indicated the disclosed treatment fluid can be used in various down-hole operations. In use, the exemplary methods and compositions disclosed herein may directly or indirectly affect one or more components or pieces of equipment associated with the preparation, delivery, recapture, recycling, reuse, and/or disposal of the disclosed compositions.

For example, and with reference to FIG. 1, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include a proppant for combination with the fracturing fluid. The system may also include an additive source 70 that provides one or more additives (e.g., tackifying agent, resin, gelling agents, weighting agents, fibers and/or other optional additives) to alter the properties of the fracturing fluid. For example, the other additives 70 can be included to reduce pumping friction, to reduce or eliminate the fluid's reaction to the geological formation in which the well is formed, to increase porosity of proppant packs and/or proppant pillars, to operate as surfactants, and/or to serve other functions.

The pump and blender system 50 receives the fracturing fluid and combines it with other components, including proppant from the proppant source 40 and/or additional fluid/material from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 can source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, and combinations of those components at yet other times.

FIG. 2 shows well 60 during a fracturing operation in a portion of a subterranean formation of interest 102 surrounding a well bore 104. Well bore 104 extends from a surface 106, and a treatment fluid 108, is applied to a portion of the subterranean formation 102 surrounding the horizontal portion of the well bore. Treatment fluid 108, can be a first treatment fluid 150, a second treatment fluid 160, a third treatment fluid 170 and a fourth treatment fluid 180.

Although shown as vertical deviating to horizontal, well bore 104 may include horizontal, vertical, slant, curved, and other types of well bore geometries and orientations, and the fracturing treatment may be applied to a subterranean zone surrounding any portion of the well bore. Well bore 104 can include a casing 110 that is cemented or otherwise secured to the well bore wall. Well bore 104 can be uncased or include uncased sections. Perforations can be formed in casing 110 to allow treatment fluids to flow into subterranean formation 102. In cased wells, perforations can be formed using shape charges, a perforating gun, hydro-jetting and/or other tools.

Well 60 is shown with a work string 112 descending from surface 106 into well bore 104. Pump and blender system 50 couples with work string 112 to pump treatment fluid 108, 132 into well bore 104. Work string 112 may include coiled tubing, jointed pipe, and/or other structures that allow fluid to flow into well bore 104. Work string 112 can include flow control devices, bypass valves, ports, and or other tools or well devices that control a flow of fluid from the interior of work string 112 into subterranean zone 102. For example, work string 112 may include ports adjacent the well bore wall to communicate treatment fluid 108 directly into subterranean formation 102. Work string 112 may include ports that are spaced apart from the well bore wall to communicate treatment fluid 108 into an annulus in well bore 104 between work string 112 and the well bore wall.

Work string 112 and/or well bore 104 may include one or more sets of packers 114 that seal the annulus between work string 112 and well bore 104 to define an interval of well bore 104 into which treatment fluid 108 will be pumped. For example purposes only, FIG. 2 shows two packers 114, one defining an up-hole boundary of the interval and one defining the down-hole end of the interval. Other embodiments may use a greater or lesser number of packers.

In some embodiments, first treatment fluid 150 is introduced into well bore 104 (e.g., in FIG. 2, the area of well bore 104 between packers 114) as a fracturing fluid at a sufficient hydraulic pressure, one or more fractures 116 may be created in subterranean formation 102. In other embodiments, first treatment fluid 150 is introduced into well bore 104 after the fractures have been formed. After introducing first treatment fluid 150, at least a portion of the uncoated first proppant 152 is deposited in fractures 116. In some embodiments, the first treatment fluid may also include fibers.

After depositing a pre-determined amount of uncoated first proppant 152 into fracture 116, second treatment fluid 160 is introduced into well bore 104 to deposit a predetermined amount of a non-hardenable coated second proppant 162 in fractures 116. In some embodiments, non-hardenable coated second proppant 162 deposited in fractures 116 forms proppant packs to retard movement of fines by adhering the fines to the non-hardenable coated second proppant 162. In some embodiments, the second treatment fluid may also include fibers.

After depositing a pre-determined amount of non-hardenable coated second proppant 162 into fractures 116, third treatment fluid 170 is introduced into well bore 104 to deposit a predetermined amount of a hardenable coated third proppant 172 in fractures 116. In some embodiments, hardenable coated third proppant 172 deposited in fractures 116 hardens and consolidates into one or more high-strength pillars which prevents third proppant 172 flow-back in fractures 116. In some embodiments, the third treatment fluid may also include fibers In some embodiments, after depositing a pre-determined amount of hardenable coated third proppant 172 into fractures 116, fourth treatment fluid 180 is introduced into well bore 104 to deposit a predetermined amount of a hardenable coated fourth proppant 182 of synthetic proppant in fractures 116. In some embodiments, hardenable coated fourth proppant 182 deposited in fractures 116 hardens and consolidates into one or more high-strength pillars which prevents fourth proppant 182 flow-back in fractures 116. In some embodiments, the fourth treatment fluid may also include fibers In accordance with the above disclosure, several embodiments will now be described. The present disclosure describes a method of treating a subterranean formation comprising the steps of:

a) introducing a first treatment fluid comprising a plurality of uncoated first proppant particulates into at least one fracture within the subterranean formation and depositing at least a portion of the uncoated first proppant particulates in the fracture;

b) after introducing the first treatment fluid, introducing into the fracture a second treatment fluid comprising a plurality of non-hardenable coated second proppant particulates and depositing at least a portion of the non-hardenable coated second proppant particulates in the fracture; and c) after introducing the second treatment fluid, introducing into the fracture a third treatment fluid comprising a plurality of hardenable coated third proppant particulates.

In another embodiment, the first proppant particulate is silica sand having a mesh size of about 80 to about 120; the second proppant particulate and third proppant particulate are silica sand having a mesh size from about 20 to about 50. In still another embodiment, the second proppant particulates form proppant packs and the third proppant particulates form high-strength pillars.

In another embodiment, the non-hardenable coating on the second proppant particulate comprises a tackifying agent selected from a group consisting of polyamides, polyesters, polyethers, polycarbamates and polycarbonates. In another embodiment, the non-hardenable coating on the second proppant particulate a reaction product of a polyacid and a multivalent ion. The multivalent ion can be aluminum, calcium or iron.

In another embodiment, after introducing the third treatment fluid, the method may include introducing a fourth treatment fluid comprising a plurality of hardenable coated fourth proppant particulates of synthetic proppant that hardens and consolidates into one or more high-strength pillars which prevents fourth proppant particle flow-back in the fracture. The fourth proppant particulates may have a mesh size from about 20 to about 70.

In still another embodiment, the hardenable coating on the third proppant particulate and the fourth proppant particulate is a hardenable resin and a hardening agent. The hardenable resin can be bisphenol A-epichlorohydrin resin, polyepoxide resin, novolak resin, polyester resin, phenol-aldehyde resin, urea-aldehyde resin, furan resin, urethane resin and mixtures thereof. The hardenable agent can be 4,4'-diaminodiphenyl sulfone, amines, amides, hexachloroacetone, 1,1,3-trichlorotrifluoroacetone, benzotrichloride, benzylchloride and benzalchloride.

In one embodiment, the first treatment fluid consists essentially of an aqueous base fluid and uncoated silica sand. In another embodiment, the second treatment fluid consists essentially of an aqueous base fluid and non-hardenable coated silica sand. In still another embodiment, the third treatment fluid consists essentially of an aqueous base fluid and hardenable coated silica sand. Also, the fourth treatment fluid can consist essentially of an aqueous base fluid and hardenable coated fourth proppant particulates of synthetic proppant. The synthetic proppant can be selected from the group consisting of bauxite proppants, ceramic proppants and combinations thereof.

In another embodiment, the subterranean formation has a closure stress greater than about 8,000 psi. In still another embodiment, the closure stress can be greater than about 9,000 psi or greater than about 10,000 psi.

Therefore, the present invention is well adapted to attain the ends and advantages mentioned, as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified, and all such variations are considered within the scope and spirit of the present invention. While compositions and methods are described in terms of "comprising," "containing," "having," or "including" various components or steps, the compositions and methods can also "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. The term "about" generally refers to a range of numbers that one of skill in the art would consider equivalent to the recited value (i.e., having the same function or result). In many instances, the term "about" may include numbers that are rounded to the nearest significant figure. Also, the terms in the claims have their plain, ordinary meaning unless otherwise explicitly and clearly defined by the patentee.

What is claimed is:

1. A method of treating a subterranean formation having a fracture closure pressure exceeding about 8,000 psi, the method comprising the steps of:

introducing a first treatment fluid comprising a plurality of uncoated first proppant particulates into at least one fracture within the subterranean formation and depositing at least a portion of the uncoated first proppant particulates in the fracture, wherein the uncoated first proppant particulates have a crush strength able to withstand pressures up to about 8,000 psi;

after introducing the first treatment fluid, introducing into the fracture a second treatment fluid comprising a plurality of non-hardenable coated second proppant particulates and depositing at least a portion of the non-hardenable coated second proppant particulates in the fracture, wherein the non-hardenable coated second proppant particulates comprise second proppant particulates coated with a tackifying agent, and the second proppant particulates have a crush strength able to withstand pressures up to about 8,000 psi; and after introducing the second treatment fluid, introducing into the fracture a third treatment fluid comprising a plurality of hardenable coated third proppant particulates, wherein the hardenable coated third proppant particulates comprise third proppant particulates coated with a hardenable resin, and the third proppant particulates have a crush strength able to withstand pressures up to about 8,000 psi and wherein said third treatment fluid is introduced so that said hardenable resin composition on the third proppant particulates hardens when in the fracture so that the hardenable coated third proppant particles consolidate into one or more pillars able to withstand closure pressures above 8,000 psi.

2. The method of claim 1, wherein the uncoated first proppant particulates are no larger than 80 mesh, and the second proppant particulates and the third proppant particulates are no smaller than 60 mesh.

3. The method of claim 1, wherein the first proppant particulates are silica sand having a mesh size of about 80 to about 120.

4. The method of claim 1, wherein the first treatment fluid further comprises fibers.

5. The method of claim 1, wherein the second proppant particulates form a proppant pack in the fracture to retard movement of at least a portion of fines by adhering the fines to the non-hardenable coated second proppant particulates.

6. The method of claim 5, wherein the non-hardenable coating on the second proppant particulates comprises a tackifying agent selected from a group consisting of polyamides, polyesters, polyethers, polycarbamates and polycarbonates.

7. The method of claim 5, wherein the second treatment fluid further comprises fibers.

8. The method of claim 5, wherein the one or more pillars prevent third proppant particle flow-back in the fracture.

9. The method of claim 8, wherein the second proppant particulates and the third proppant particulates are silica sand having a mesh size from about 20 to about 50.

10. The method of claim 8, wherein the third treatment fluid further comprises fibers.

11. The method of claim 8, further comprising, after introducing the third treatment fluid, introducing a fourth treatment fluid comprising a plurality of hardenable coated fourth proppant particulates, wherein the hardenable coated fourth proppant particulates comprise fourth proppant particulates coated with a hardenable resin, and the fourth proppant particulates have a crush strength able to withstand pressures above 8,000 psi, and the hardenable coated fourth proppant particulates harden and consolidate into one or more pillars which prevents fourth proppant particle flow-back in the fracture.

12. The method of claim 11, wherein the fourth treatment fluid further comprises fibers.

13. The method of claim 11, wherein the uncoated first proppant particulates are no larger than 80 mesh, and the second proppant particulates and the third proppant particulates are no smaller than 60 mesh.

14. The method of claim 13, wherein the fourth proppant particulates are synthetic proppant particulates.

15. The method of claim 14, wherein the first treatment fluid, the second treatment fluid, the third treatment fluid and the fourth treatment fluid are introduced into the subterranean formation for use in a fracturing operation using one or more pumps.

16. The method of claim 1, wherein the hardenable coating on the third proppant particulates comprises the hardenable resin and a hardening agent.

17. The method of claim 16, wherein the hardenable resin is selected from a group consisting of bisphenol A-epichlorohydrin resin, polyepoxide resin, novolak resin, polyester resin, phenol-aldehyde resin, urea-aldehyde resin, furan resin, urethane resin and mixtures thereof, and wherein the hardening agent is selected from a group consisting of 4,4'-diaminodiphenyl sulfone, amines, amides, hexachloroacetone, 1,1,3-trichlorotrifluoroacetone, benzotrichloride, benzylchloride and benzalchloride.

18. The method of claim 11, wherein the hardenable coating on the fourth proppant particulates comprises the hardenable resin and a hardening agent.

19. The method of claim 18, wherein the hardenable resin is selected from a group consisting of bisphenol A-epichlorohydrin resin, polyepoxide resin, novolak resin, polyester resin, phenol-aldehyde resin, urea-aldehyde resin, furan resin, urethane resin and mixtures thereof, and wherein the hardening agent is selected from a group consisting of 4,4'-diaminodiphenyl sulfone, amines, amides, hexachloroacetone, 1,1,3-trichlorotrifluoroacetone, benzotrichloride, benzylchloride and benzalchloride.

* * * * *